United States Patent
Monfray

(10) Patent No.: US 11,822,164 B2
(45) Date of Patent: Nov. 21, 2023

(54) ELECTRO-OPTICAL PHASE MODULATOR

(71) Applicant: STMicroelectronics (Crolles 2) SAS, Crolles (FR)

(72) Inventor: Stephane Monfray, Eybens (FR)

(73) Assignee: STMicroelectronics (Crolles 2) SAS, Crolles (FR)

(*) Notice: Subject to any disclaimer, the term of this patent is extended or adjusted under 35 U.S.C. 154(b) by 719 days.

(21) Appl. No.: 17/009,468

(22) Filed: Sep. 1, 2020

(65) Prior Publication Data

US 2020/0400978 A1 Dec. 24, 2020

Related U.S. Application Data

(63) Continuation of application No. 16/247,096, filed on Jan. 14, 2019, now Pat. No. 10,795,189.

(30) Foreign Application Priority Data

Jan. 15, 2018 (FR) ........................... 1850290

(51) Int. Cl.
*G02F 1/025* (2006.01)

(52) U.S. Cl.
CPC .......... *G02F 1/025* (2013.01); *G02F 2202/06* (2013.01); *G02F 2202/104* (2013.01); *G02F 2202/105* (2013.01); *G02F 2203/50* (2013.01)

(58) Field of Classification Search
CPC ............... G02F 1/025; G02F 2202/06; G02F 2202/104; G02F 2202/105; G02F 2203/50; G02F 1/011

See application file for complete search history.

(56) References Cited

U.S. PATENT DOCUMENTS

| | | | | |
|---|---|---|---|---|
| 5,530,777 A | * | 6/1996 | Enokihara | G02F 1/0356 385/2 |
| 6,965,128 B2 | * | 11/2005 | Holm | H01L 21/8258 385/11 |
| 7,747,122 B2 | * | 6/2010 | Shetrit | G02B 6/12004 359/279 |

(Continued)

FOREIGN PATENT DOCUMENTS

| | | |
|---|---|---|
| CN | 101842736 A | 9/2010 |
| CN | 105934703 A | 9/2016 |

(Continued)

OTHER PUBLICATIONS

First Office Action and Search Report for family-related CN Appl. No. 201910033040.9, report dated Apr. 27, 2022, 6 pgs.

INPI Search Report and Written Opinion for FR 1850290 dated Sep. 4, 2018 (8 pages).

(Continued)

*Primary Examiner* — S M Sohel Imtiaz

(74) *Attorney, Agent, or Firm* — CROWE & DUNLEVY

(57) ABSTRACT

An electro-optical phase modulator includes a waveguide made from a stack of strips. The stack includes a first strip made of a doped semiconductor material of a first conductivity type, a second strip made of a conductive material or of a doped semiconductor material of a second conductivity type, and a third strip made of a doped semiconductor material of the first conductivity type. The second strip is separated from the first strip by a first interface layer made of a dielectric material, and the third strip is separated from the second strip by a second interface layer made of a dielectric material.

13 Claims, 4 Drawing Sheets

(56) References Cited

U.S. PATENT DOCUMENTS

| | | | |
|---|---|---|---|
| 8,180,184 B2* | 5/2012 | Park | G02F 1/025 385/2 |
| 8,559,769 B2* | 10/2013 | Rasras | G02F 1/2257 385/9 |
| 9,703,125 B2* | 7/2017 | Fujikata | G02F 1/025 |
| 9,798,166 B1* | 10/2017 | Sharma | G02F 1/025 |
| 2006/0198581 A1* | 9/2006 | Belmonte | G02F 1/0316 385/40 |
| 2011/0211786 A1* | 9/2011 | Ushida | G02F 1/025 385/2 |
| 2016/0147087 A1* | 5/2016 | Patel | G02B 6/136 216/18 |
| 2017/0075148 A1 | 3/2017 | Baudot et al. | |

FOREIGN PATENT DOCUMENTS

| | | |
|---|---|---|
| CN | 106170865 A | 11/2016 |
| CN | 209471312 U | 10/2019 |
| FR | 3041115 A1 | 3/2017 |

OTHER PUBLICATIONS

A. G Rojas-Hernandez et al: "Modulator for a micro Mach-Zhender spectrometer", Proceedings of SPIE , vol. 8785, Nov. 18, 2013 (Nov. 18, 2013), pp. 878523-878523-6, XP 055503943, 1000 20th St. Bellingham WA 98225-6705 USA ISSN: 0277-786X, DOI: 10.1117/12.2019447 ISBN: 978-1-5106-1533-5 * Chapter 2. Structure *.

Chen Shaowu et al: "On the design and simulation of hight speed electro-optic modulator based on SOI waveguide MOS dual capacitor structure", Group IV Photonics, NUD IEEE International Conference on Antwerpen, Belgium Sep. 21-23, 2005, Piscataway, NJ, USA, IEEE, Sep. 21, 2005 (Sep. 21, 2005), pp. 54-56, XP010841325, DOI: 10.1109/GROUP4.2005.1516401 ISBN: 978-0-7803-9070-6 * figure 1*.

Ling Lia et al: "Silicon photonic modulator and integration for high—speed applications", IEEE International Electron Devices Meeting, 2008 : IEDM 2008 ; San Francisco, CA, USA, Dec. 15-17, 2008, IEEE, Piscataway, NJ, USA, Dec. 15, 2008 (Dec. 15, 2008), pp. 1-4, XP031434481, ISBN: 978-1-4244-2377-4 * figure 1 *.

* cited by examiner

ELECTRO-OPTICAL PHASE MODULATOR

CROSS REFERENCE TO RELATED APPLICATIONS

This application is a continuation of U.S. patent application Ser. No. 16/247,096 filed Jan. 14, 2019, which claims the priority benefit of French Application for Patent No. 1850290, filed on Jan. 15, 2018, the content of which are hereby incorporated by reference in their entireties to the maximum extent allowable by law.

TECHNICAL FIELD

The present disclosure relates to an electro-optical phase modulator and to a method of manufacturing such a modulator.

BACKGROUND

Electro-optical phase modulators are devices used in optical communication systems to vary the phase of a light beam, for example, a laser beam. The phase variations of the light beam enable to code information which are then transmitted in the form of an optical signal. Phase modulators may, for example, be used in light beam amplitude modulation systems, for example, Mach-Zehnder-Interferometer (MZI) type modulators, to transmit information in the form of an amplitude-modulated optical signal.

An electro-optical phase modulator comprising a stack of a strip of doped silicon of a first conductivity type and of a strip of doped silicon of the second conductivity type, the two strips being separated from each other by an interface layer made of a dielectric material to form a capacitor, has already been provided, for example in French Patent Application No. FR3041116 (corresponding to United States Patent Application Publication No. 2017/0075148, incorporated by reference). In such a modulator, also called capacitive modulator, each of the strips is coupled to an electric contact, and the assembly of the two strips is surrounded with a dielectric material having an optical index lower than that of silicon, to form a waveguide capable of propagating a light beam along the longitudinal strip direction. In operation, an optical beam, for example, a laser beam, is injected into the waveguide. The density of free carriers in the two silicon strips is modulated by applying a potential difference between the two strips. This results in a modification of the effective optical index of the waveguide, and thus in a phase shift of the laser light beam according to the applied voltage.

It would be desirable to at least partly improve certain aspects of known electro-optical phase modulators. In particular, it would be desirable to be able to improve the electro-optical conversion efficiency, that is, the ratio of the control voltage level applied to the modulator to the corresponding phase shift of the optical beam, to decrease the electric power consumption of the modulator.

SUMMARY

An embodiment provides an electro-optical phase modulator comprising a waveguide comprising a stack of a first strip made of a doped semiconductor material of a first conductivity type, of a second strip made of a conductive material or of a doped semiconductor material of the second conductivity type, and of a third strip made of a doped semiconductor material of the first conductivity type, the second strip being separated from the first strip by a first interface layer made of a dielectric material and from the third strip by a second interface layer made of a dielectric material.

According to an embodiment, the first and third strips are coupled to a same node of application of a control voltage of the modulator, and the second strip is coupled to a second node of application of the modulator control voltage.

According to an embodiment: the first strip is laterally continued by a first extension region made of the same material as the first strip, electrically coupling the first strip to the first node of application of the control voltage; the second strip is laterally continued by a second extension region made of the same material as the second strip, electrically coupling the second strip to the second node of application of the control voltage; and the third strip is laterally continued by a third extension region made of the same material as the third strip, electrically coupling the third strip to the first node of application of the control voltage.

According to an embodiment, at least one of the first and third extension regions has a thickness smaller than that of the strip in contact therewith.

According to an embodiment, the modulator comprises a first electric connection metallization in contact with the first extension region, a second electric connection metallization in contact with the second extension region, and a third electric connection metallization in contact with the third extension region.

According to an embodiment, the modulator further comprises a conductive track interconnecting the first and third electric connection metallizations.

According to an embodiment, each of the first, second, and third strips is made of a material selected from silicon and silicon-germanium.

According to an embodiment, the first strip is made of doped single-crystal silicon of the first conductivity type, the second strip is made of doped polysilicon of the second conductivity type, and the third strip is made of doped polysilicon of the first conductivity type or of silicon-germanium.

According to an embodiment, the thickness of the second strip is smaller than one fifth of the thickness of the first strip and of the thickness of the third strip.

According to an embodiment, the first and third strips have substantially the same thickness.

Another embodiment provides a method of manufacturing an electro-optical phase modulator as defined hereabove, wherein the first strip is formed in the upper layer of an SOI-type structure comprising a single-crystal silicon layer resting on an insulating layer, itself arranged on a support substrate.

BRIEF DESCRIPTION OF THE DRAWINGS

The foregoing and other features and advantages will be discussed in detail in the following non-limiting description of specific embodiments in connection with the accompanying drawings, wherein.

DETAILED DESCRIPTION

Figure 1:
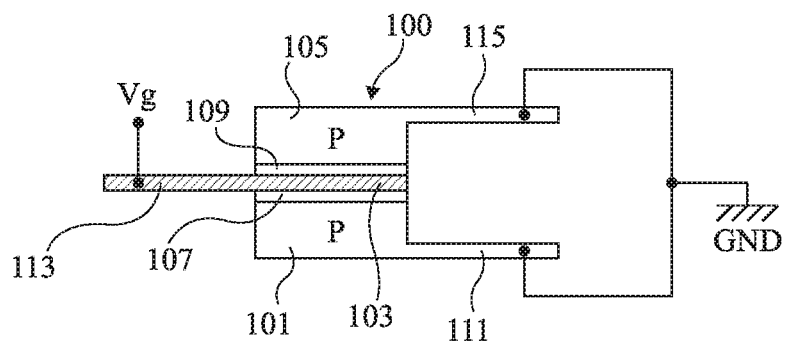
FIG. 1 is a simplified cross-section view of an example of an electro-optical phase modulator according to an embodiment.

The same elements have been designated with the same reference numerals in the various drawings and, further, the various drawings are not to scale. For clarity, only those steps and elements which are useful to the understanding of the described embodiments have been shown and are detailed. In particular, the control circuits and other optical or electronic components likely to be coupled to the described modulators have not been detailed, the described modulators begin compatible with usual components of optical communication systems, provided to make the possible necessary adaptations within the abilities of those skilled in the art on reading of the present description. In the following description, when reference is made to terms qualifying absolute positions, such as terms "front", "rear", "top", "bottom", "left", "right", etc., or relative positions, such as terms "above", "under", "upper", "lower", etc., or to terms qualifying orientation, such as terms "horizontal", "vertical", "vertically in line with", etc., reference is made to the orientation of the drawings, it being understood that, in practice, the devices may be oriented differently. The terms "approximately", "substantially", and "in the order of" are used herein to designate a tolerance of plus or minus 10%, preferably of plus or minus 5%, of the value in question.

FIG. 1 is a cross-section view schematically illustrating an example of an electro-optical phase modulator according to an embodiment.

The modulator of FIG. 1 comprises a waveguide 100 comprising a vertical stack of three strips 101, 103, and 105 substantially having the same width. FIG. 1 is a cross-section view along a plane orthogonal to the longitudinal directions of strips 101, 103 and 105, that is, along a plane orthogonal to the propagation direction of light in waveguide 100. In the cross-section view of FIG. 1, the width of each strip corresponds to its horizontal dimension and the thickness of each strip corresponds to its vertical dimension.

Strip 101 is made of a doped semiconductor material of a first conductivity type, type P in the shown example, strip 103 is made of a doped semiconductor material of the second conductivity type (type N in this example) or of a conductive material, and strip 105 is made of a doped semiconductor material of the first conductivity type. Strip 103 is separated from strip 101 by an interface layer 107 made of a dielectric material, and from strip 105 by an interface layer 109 made of a dielectric material. As an example, layer 107 is arranged on top of and in contact with the upper surface of strip 101, strip 103 is arranged on top of and in contact with the upper surface of layer 107, vertically in line with strip 101, layer 109 is arranged on top of and in contact with the upper surface of strip 103, and strip 105 is arranged on top of and in contact with the upper surface of layer 109, vertically in line with strips 101 and 103.

Strips 101 and 105 are electrically coupled to a same first node GND of application of a control voltage of the modulator, and strip 103 is electrically coupled to a second node Vg of application of the modulator control voltage.

In the shown example, each of strips 101, 103, and 105 is laterally continued (that is, widthwise, that is, in a horizontal direction in the orientation of FIG. 1) by an extension region 111, respectively 113, respectively 115 made of the same material as the strip, having an electric contact (not detailed in FIG. 1) formed thereon, enabling to electrically couple the strip to the corresponding control node (node GND for strips 101 and 105 and node Vg for strip 103). In this example, extension region 111 of strip 101 and extension region 115 of strip 105 are located on the same side of the stack (right-hand side in the orientation of FIG. 1) and extension region 113 of strip 103 is located on the opposite side of the stack (left-hand side in the orientation of FIG. 1). The described embodiments are, however, not limited to this specific case. Further, in this example, extension region 111 of strip 101 is thinner than strip 101, and extension region 115 of strip 105 is thinner than strip 105, the lower surface of region 111 being located at the level of the lower surface of strip 101 and the upper surface of region 115 being located at the level of the upper surface of strip 105. Here again, the described embodiments are not limited to this specific configuration. As a variation, only one of extension regions 111 and 115 is thinner than the corresponding strip 101 or 105. In another variation, all or certain of the extension regions may be omitted, with the electric contacts being then directly arranged on strips 101, 103, and/or 105.

Waveguide 100 is surrounded with a dielectric material (not shown in FIG. 1) having a refraction index lower than that of strips 101, 103, and 105, for example, silicon oxide. As an example, the dielectric material totally covers the upper and lower surfaces of the waveguide, as well as the lateral surfaces of the waveguide which are not coated with extension regions 111, 113, and 115.

Strips 101, 103, and 105 are, for example, made of silicon. As a variation, strips 101 and 105 are made of silicon and strip 103 is made of metal. As an example, strips 101 and 105 have a P-type doping level greater than $10^{17}$ atoms/cm$^3$, for example in the order of $2*10^{18}$ atoms/cm$^3$. In the case where strip 103 is made of silicon, it may have an N-type doping level greater than $10^{18}$ atoms/cm$^3$, for example, greater than $5*10^{18}$ atoms/cm$^3$. Interface layers 107 and 109 are, for example, made of silicon oxide. Strip 103 is preferably relatively thin as compared with strips 101 and 105. As an example, the thickness of strip 103 is smaller than one fifth, and preferably smaller than one tenth, of the thickness of strip 101 and of the thickness of strip 105. Strips 101 and 105, for example, have substantially the same thickness. As an example, strips 101 and 105 each have a thickness in the range from 50 to 200 nm, for example, in the order of 150 nm, and strip 103 has a thickness in the range from 5 to 20 nm. The thickness of dielectric interface layers 107 and 109 is, for example, smaller than the thickness of strip 103. As an example, layers 107 and 109 each have a thickness smaller than 10 nm, for example, in the order of 8 nm. Strips 101, 103, and 105, for example, have substantially the same width, defining the width of waveguide 100, for example, in the range from 300 to 600 nm, for example, in the order of 350 nm. Strips 101, 103, and 105 may further have substantially the same length, defining the length of waveguide 100, for example, in the range from 0.5 to 2 mm, for example, in the order of 1 mm.

In operation, an optical beam, for example, a laser beam (not shown), is injected into the waveguide, and a control voltage is applied between control nodes Vg and GND of the modulator. The density of free carriers in the two semiconductor strips 101 and 105 and, possibly, in intermediate strip 103, is modified according to the applied control voltage. This results in a modification of the effective optical index of the waveguide, and thus in a phase shift of the laser according to the applied voltage.

As compared with capacitive phase modulators of the type described in above-mentioned patent applications FR3041116 and US2017/0075148, the modulator of FIG. 1 has the advantage of benefiting from a better electro-optical conversion efficiency. In other words, a given phase shift can be obtained by applying a lower control voltage than in a conventional modulator.

This results from the fact that intermediate strip 103 enables to more efficiently modulate the density of free carriers at the core of waveguide 100, where the impact on the effective optical index of the guide is the strongest, and in particular in the vicinity of the upper surface of lower portion 101 of the guide, and in the vicinity of the lower surface of upper portion 105 of the guide.

FIGS. 2A, 2B, 2C, 2D, 2E, 2F, 2G, 2H, and 2I are cross-section views illustrating successive steps of an example of a method of manufacturing an electro-optical phase modulator of the type described in relation with FIG. 1. FIGS. 2A, 2B, 2C, 2D, 2E, 2F, 2G, 2H and 2I are cross-section views in the same plane as FIG. 1.

Figure 2A:
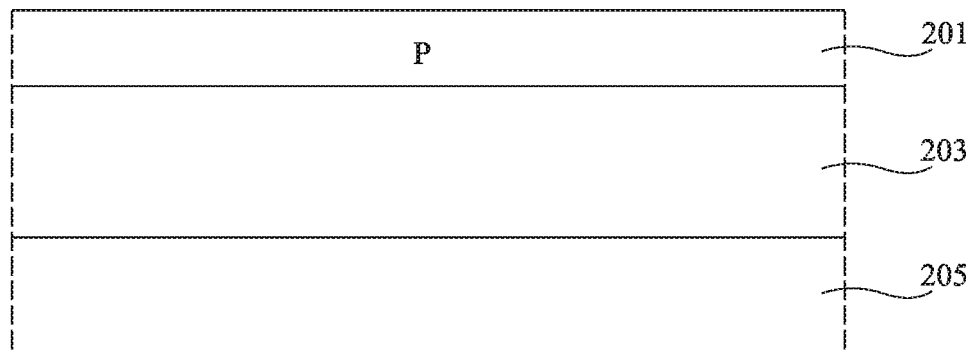
FIGS. 2A, 2B, 2C, 2D, 2E, 2F, 2G, 2H, and 2I are cross-section views illustrating an example of a method of manufacturing an electro-optical phase modulator according to an embodiment.

FIG. 2A shows an initial SOI-type structure (semiconductor on insulator) comprising a P-type doped single-crystal silicon layer 201, resting on an insulating layer 203, itself arranged on a support substrate 205, for example, made of silicon. In this example, insulating layer 203 is a silicon oxide layer, for example, having a thickness in the range from 1 to 2 μm. Silicon layer 201, for example, has a thickness in the order of 300 nm.

Figure 2B:
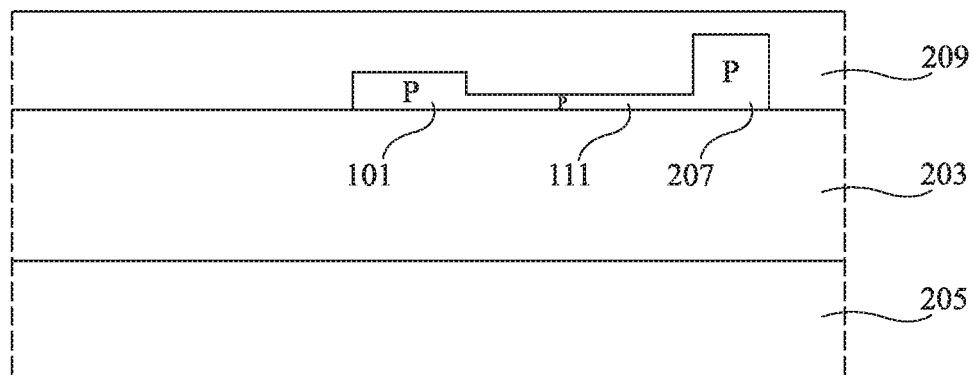

FIG. 2B illustrates the forming, in silicon layer 201, of a lower portion of the modulator, particularly comprising lower strip 101 of waveguide 100 and the corresponding lateral extension region 111. More particularly, in this example, three successive etch steps (not detailed) are provided to delimit in layer 201 a three-layer structure comprising:

a first region having a first thickness, for example, in the order of 150 nm, corresponding to lower strip 101 of waveguide 100;

a second region thinner than strip 101, for example, having a thickness in the order of 50 nm, laterally extending from the lower portion of a lateral surface (the right-hand surface in the orientation of FIG. 1) of strip 101, and forming extension region 111 of the modulator; and a third region 207 thicker than strip 101, for example, having a thickness equal to the original thickness of layer 201, laterally continuing extension region 111 on its surface opposite to strip 101, and forming a contacting region intended to electrically couple strip 101 (via region 111) to a node of application of a control voltage of the modulator.

In the length direction (not shown in the drawing), regions 111 and 207 for example extend over the same length as strip 101.

At the end of the steps of etching silicon layer 201, a step of depositing a silicon oxide layer 209 is provided, followed by a step of planarizing layer 209, for example, by chemical-mechanical polishing (CMP). At the end of the steps of FIG. 2B, the silicon structure formed by regions 101, 111, and 207 is totally encapsulated in silicon oxide. More particularly, the lateral surfaces and the upper surface of the structure are in contact with silicon oxide layer 209, and the lower surface of the structure is in contact with the upper surface of silicon oxide layer 203.

Figure 2C:
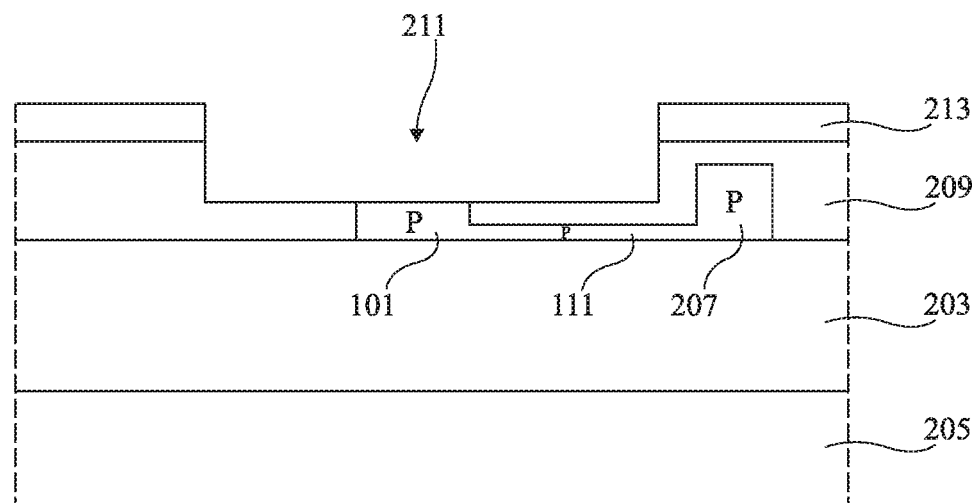

FIG. 2C illustrates a step of forming an opening 211 in layer 209, opening 211 emerging on (i.e., exposing) the upper surface of strip 101. Opening 211 extends, widthwise, not only opposite strip 101, but also on either side of strip 101, and particularly opposite a portion of lateral extension region 111 (to the right of strip 101) without however emerging out of region 111, the upper surface of which remains protected by layer 209 at the end of this step. Opening 211 however does not extend opposite silicon region 207. In the length direction (not shown in the drawing), opening 211 extends over substantially the entire length of strip 101. To form opening 211, an etch mask 213 is first formed on the upper surface of silicon oxide layer 209, for example, by photolithography. Mask 213 comprises an opening defining, in top view, the region where opening 211 is formed. A step of etching the region of layer 209 which is not coated with mask 213 is then implemented, the etching being interrupted on the upper surface of silicon strip 101. Mask 213 can then be removed.

Figure 2D:
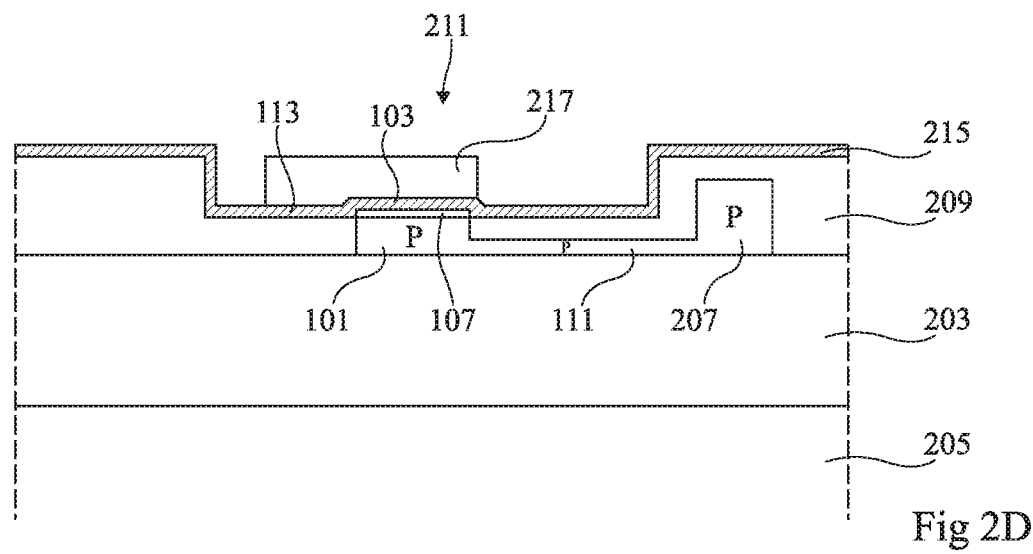

FIG. 2D illustrates a step of oxidizing the upper surface of silicon strip 101, exposed by the previous step of partial etching of layer 209, resulting in the forming, on the upper surface of strip 101, of lower interface layer 107 of waveguide 100. As a variation, layer 107 may be formed by deposition of a silicon oxide layer on the upper surface of strip 101.

FIG. 2D further illustrates a step of depositing, on the upper surface of the structure obtained at the end of the previous steps, of a layer 215 made of the material forming intermediate strip 103 of the waveguide, N-type doped polysilicon in the present example. In the present example, layer 215 is deposited over substantially the entire upper surface of the structure. Layer 215 particularly covers the lateral walls and the bottom of opening 211. In particular, at the bottom of opening 211, layer 215 is in contact with the upper surface of interface layer 107 vertically in line with strip 101, and with the upper surface of layer 209 on either side of strip 101.

FIG. 2D further illustrates a step of forming, on the upper surface of layer 215, an etch mask 217 defining, in top view, intermediate strip 103 and the corresponding extension region 113 of the modulator. Mask 217 is, for example, formed by photolithography. Mask 217 covers the upper surface of layer 215 vertically in line with regions 103 and 113 of the modulator, and leaves the upper surface of layer 215 exposed in the other regions of the modulator.

Figure 2E:
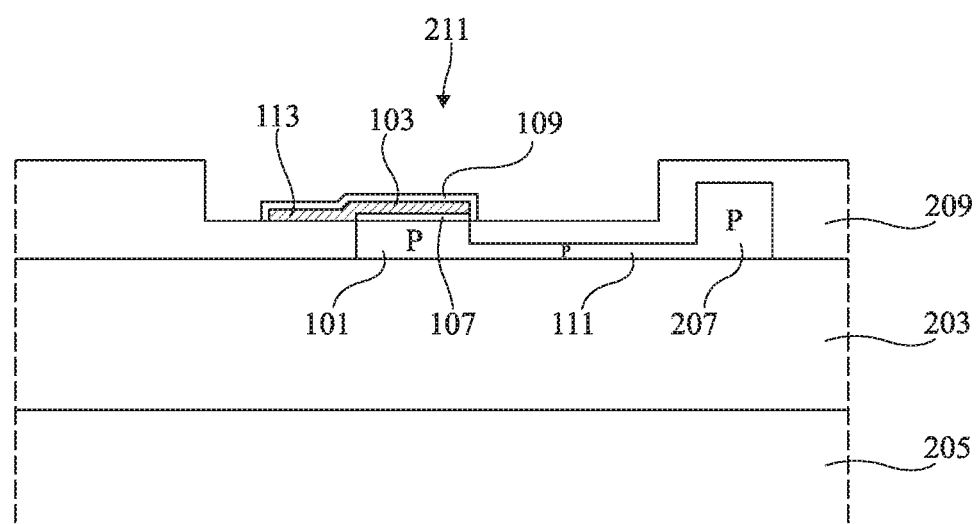

FIG. 2E illustrates a subsequent step of etching the portions of layers 215 which are not coated with mask 217, to delimit regions 103 and 113 of the modulator. FIG. 2E further illustrates a step of removing mask 217. It should be noted that in this example, regions 103 and 113 have substantially the same thickness.

FIG. 2E further illustrates a step of oxidizing the upper surface and the lateral surfaces of the remaining portion of layer 215 (forming regions 103 and 113 of the modulator), resulting in the forming of upper interface layer 109 of the waveguide. As a variation, layer 109 may be formed by deposition of a silicon oxide layer on the upper surface of strip 103.

Figure 2F:
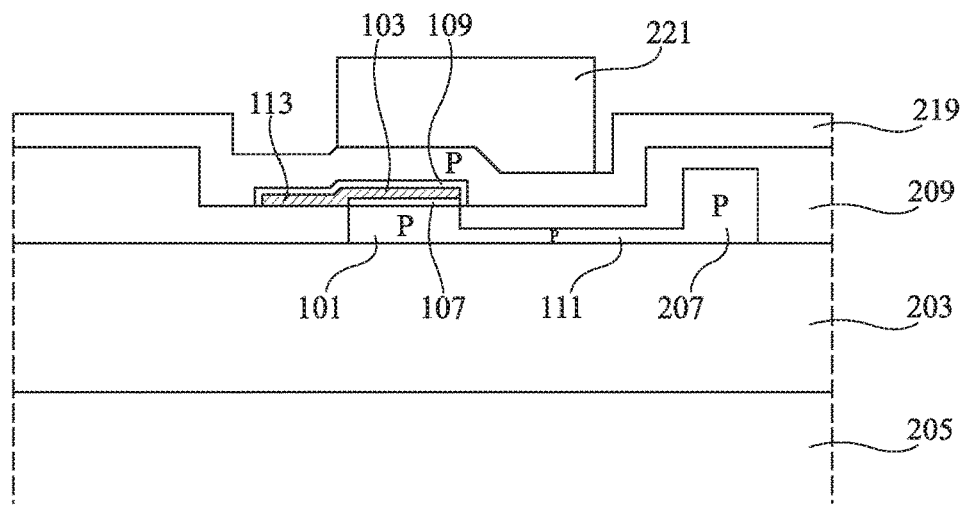

FIG. 2F illustrates a step of depositing, on the upper surface of the structure obtained at the end of the previous steps, a layer 219 of the material for forming upper strip 105 of the waveguide, for example, P-type doped polysilicon, or P-type doped polycrystalline silicon-germanium. In this example, layer 219 is deposited over substantially the entire upper surface of the structure. Layer 215 particularly coats the upper surface of interface layer 109 vertically in line with strips 101 and 103, and further laterally extends on either side of strips 101 and 103.

FIG. 2F further illustrates the forming, on the upper surface of layer 219, of an etch mask 221 defining, in top view, upper strip 105 and the corresponding extension region 115 of the modulator. Mask 221 is for example formed by photolithography. Mask 221 covers the upper surface of layer 219 vertically in line with regions 105 and 115 of the modulator, and leaves the upper surface of layer 219 exposed in the other regions of the modulator.

Figure 2G:
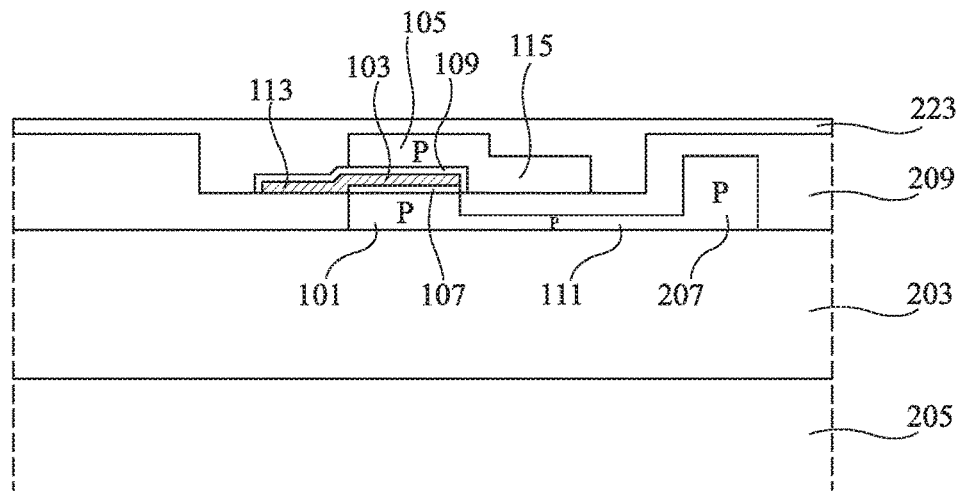

FIG. 2G illustrates a subsequent step of etching the portions of layer 219 which are not coated with mask 221, to delimit regions 105 and 115 of the modulator. FIG. 2F further illustrates a step of removing mask 221. It should be noted that in this example, regions 105 and 115 have substantially the same thickness.

FIG. 2G further illustrates a step of depositing a silicon oxide layer 223 over the entire upper surface of the structure obtained after the previous steps, followed by a step of planarizing layer 223, for example, by chemical-mechanical polishing (CMP). Silicon oxide layer 223 has a thickness greater than that of the stack of strips 107, 103, 109, and 105 so that, at the end of the planarization step, a silicon oxide thickness of layer 223 remains above the upper surface of strip 105.

Figure 2H:
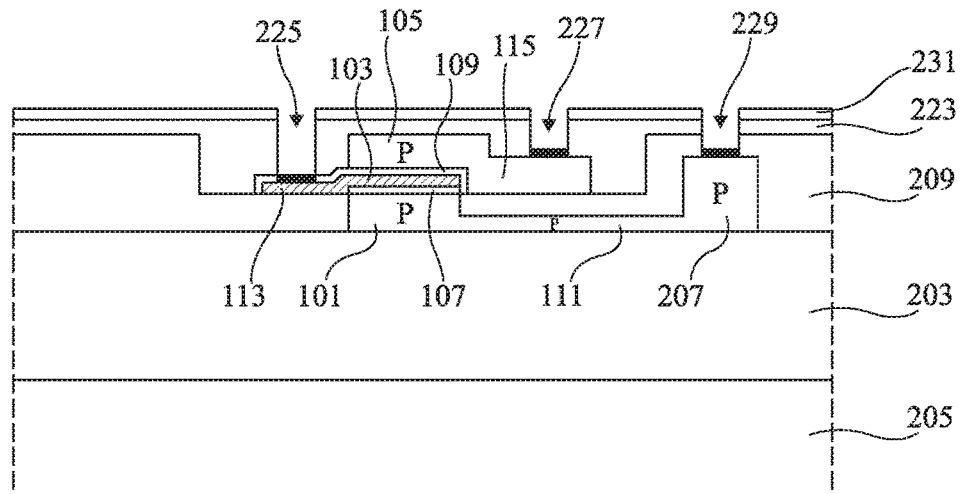

FIG. 2H illustrates a subsequent step of forming contacting openings 225, 227, and 229, respectively opposite extension region 113, opposite extension region 115, and opposite contacting region 207 of the modulator. Opening 225 vertically extends through layers 223 and 109 opposite a portion of extension region 113 of the modulator, and emerges on the upper surface of extension region 113. Opening 227 vertically extends through layer 223 opposite a portion of extension region 115 of the modulator, and emerges on the upper surface of extension region 115. Opening 229 vertically extends through layers 223 and 209 opposite contacting region 207 of the modulator, and emerges on the upper surface of region 207.

In this example, to form contacting openings 225, 227, and 229, a protection layer 231, for example, made of silicon nitride, is first deposited over the entire upper surface of the structure. Protection layer 231 is then locally removed, for example, by photolithography and etching, opposite the area where openings 225, 227, and 229 are formed. Silicon oxide layers 223, 109, and 209 are then etched, for example, by wet etching, opposite the openings previously formed in protection layer 231, to form openings 225, 227, and 229.

After the forming of openings 225, 227, and 229, a step of siliciding the upper surface of regions 113, 115, and 207 at the bottom of openings 225, 227, and 229 may be provided, aiming at easing the subsequent transfer of electric contacts onto regions 113, 115, and 207.

Figure 2I:
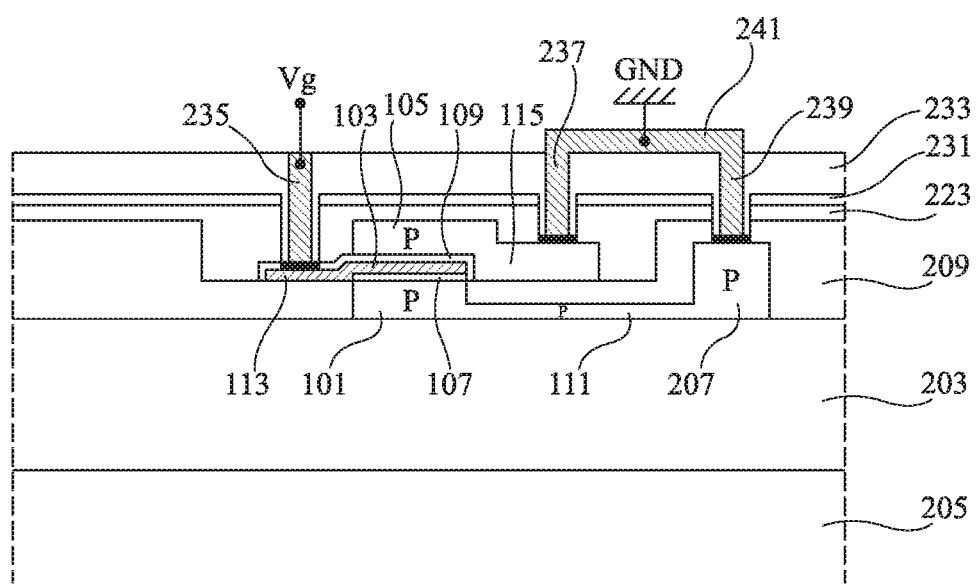

FIG. 2I illustrates a step of depositing a silicon oxide layer 233 over the entire upper surface of the structure obtained at the end of the previous steps, and then of planarizing layer 233, for example, by chemical-mechanical polishing (CMP).

Conductive vias 235, 237, and 239, for example, made of tungsten, are then formed in silicon oxide layer 233. On their lower surface side, vias 235, 237, and 239 are in electric contact respectively with the upper surface of region 113, with the upper surface of region 115, and with the upper surface of region 207. Vias 235, 237, and 239 form terminals of electric connection of the modulator to an external control circuit, not shown. In this example, vias 237 and 239 are intended to be connected to a same first node GND of the control circuit, and via 235 is intended to be connected to a second node Vg of the control circuit. In this example, the modulator comprises, on the upper surface of silicon oxide layer 233, a conductive track 241 connecting the upper surface of via 237 to the upper surface of via 239.

Specific embodiments have been described. Various alterations, modifications, and improvements will occur to those skilled in the art. In particular, it should be noted that an operation similar to what has been described hereabove may be obtained by inverting all the conductivity types of the semiconductor regions.

Further, the described embodiments are not limited to the examples of dimensions and of materials mentioned in the present disclosure.

Further, the described embodiments are not limited to the example of a manufacturing method described in relation with FIGS. 2A to 2I. More generally, it will be within the abilities of those skilled in the art to provide other methods of manufacturing a phase modulator of the type described in relation with FIG. 1, based on known integrated photonic circuit manufacturing techniques.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

The invention claimed is:

1. A method, comprising:
    etching a semiconductor layer of a silicon-on-insulator (SOI) substrate to form a first strip portion of a waveguide comprising a first region having a first thickness and a second region having a second thickness that is smaller than the first thickness;
    covering the first strip portion with an insulating material;
    forming an opening in the insulating material that exposes an upper surface of the first region, with the insulating material remaining at a bottom of the opening sufficient to cover an upper surface of second region;
    covering the exposed upper surface of the first region with a first insulating layer;
    forming a second strip portion of the waveguide on the first insulating layer and on the insulating material at the bottom of the opening;
    covering an upper surface of the second strip portion with a second insulating layer; and
    forming a third strip portion of the waveguide on the second insulating layer and on the insulating material at the bottom of the opening.

2. The method of claim 1, wherein the waveguide is an electro-optical phase modulator, and further comprising:
    making a first electrical contact to the first strip portion;
    making a second electrical contact to the second strip portion; and
    making a third electrical contact to third strip portion.

3. The method of claim 2, wherein etching the semiconductor layer of the silicon-on-insulator (SOI) substrate further forms a third region of the first strip portion of the waveguide, and wherein making the first electrical contact comprises making contact with the third region.

4. The method of claim 3, wherein the third region has a third thickness that is greater than the first thickness and greater than the second thickness.

5. The method of claim 2, wherein making the first, second and third electrical contacts comprises forming a silicide contact.

6. The method of claim 1, wherein the second strip portion of the waveguide on the insulating material at the bottom of the opening is located on one side of the first region of the first strip portion and the third strip portion of the waveguide on the insulating material at the bottom of the opening is located on another side of the first region of the first strip portion opposite said one side.

7. The method of claim 6, wherein the third strip portion of the waveguide on the insulating material at the bottom of the opening extends over the second region of the first strip portion.

8. The method of claim 1, wherein the insulating material is a silicon oxide material.

9. The method of claim 1, wherein the semiconductor layer of the SOI substrate is single crystal semiconductor material.

10. The method of claim 9, wherein the second strip portion of the waveguide is doped polysilicon material.

11. The method of claim 9, wherein the third strip portion of the waveguide is doped polysilicon material.

12. The method of claim 9, wherein the third strip portion of the waveguide is doped polycrystalline silicon-germanium material.

13. The method of claim 1, wherein the first insulating layer and the second insulator layer are thermal oxidation layers.

* * * * *